United States Patent [19]

Sundeen et al.

[11] 4,310,174

[45] Jan. 12, 1982

[54] STEERING COLUMN ELECTRICAL CONNECTOR ARRANGEMENT

[75] Inventors: Arthur R. Sundeen, Lansing, Mich.; Harold V. Elliott, Syracuse, Ind.

[73] Assignee: General Motors Corporation, Detroit, Mich.

[21] Appl. No.: 91,800

[22] Filed: Nov. 6, 1979

Related U.S. Application Data

[63] Continuation-in-part of Ser. No. 894,428, Apr. 7, 1978, abandoned.

[51] Int. Cl.³ .............................................. B60R 21/08
[52] U.S. Cl. ................................. 280/731; 200/61.54; 200/302; 219/202; 280/735
[58] Field of Search ....................... 280/731, 736, 735; 219/209, 202; 200/61.54, 302

[56] References Cited

U.S. PATENT DOCUMENTS

| | | | |
|---|---|---|---|
| 2,632,083 | 3/1953 | Shaffer | 219/209 |
| 3,525,536 | 8/1970 | Pruneski | 280/731 |
| 3,876,272 | 4/1975 | Tsutsumi | 280/731 |
| 3,968,979 | 7/1976 | Schiesterl | 280/731 |
| 3,980,318 | 9/1976 | Balban | 280/735 |
| 4,026,580 | 5/1977 | Wulf | 280/736 |

OTHER PUBLICATIONS

Fisher Body Part No. 9632394—As disclosed in General Motors Service Manual, pp. 5-32 & 5-33, 8-1974.

Primary Examiner—John P. Silverstrim
Attorney, Agent, or Firm—Edward J. Biskup

[57] ABSTRACT

An electrical connector arrangement for a motor vehicle steering assembly which includes a stationary steering column member rotatably supporting a steering shaft fixed with a steering wheel and characterized in that the steering column member supports a pair of concentric conductor rings that are adapted to be electrically connected to a sensor that forms a part of an occupant restraint cushion system. A heater element is provided for heating the conductor rings so as to prevent frost from forming thereon in cold weather and causing variations in the contact resistance of the electrical connector arrangement.

2 Claims, 5 Drawing Figures

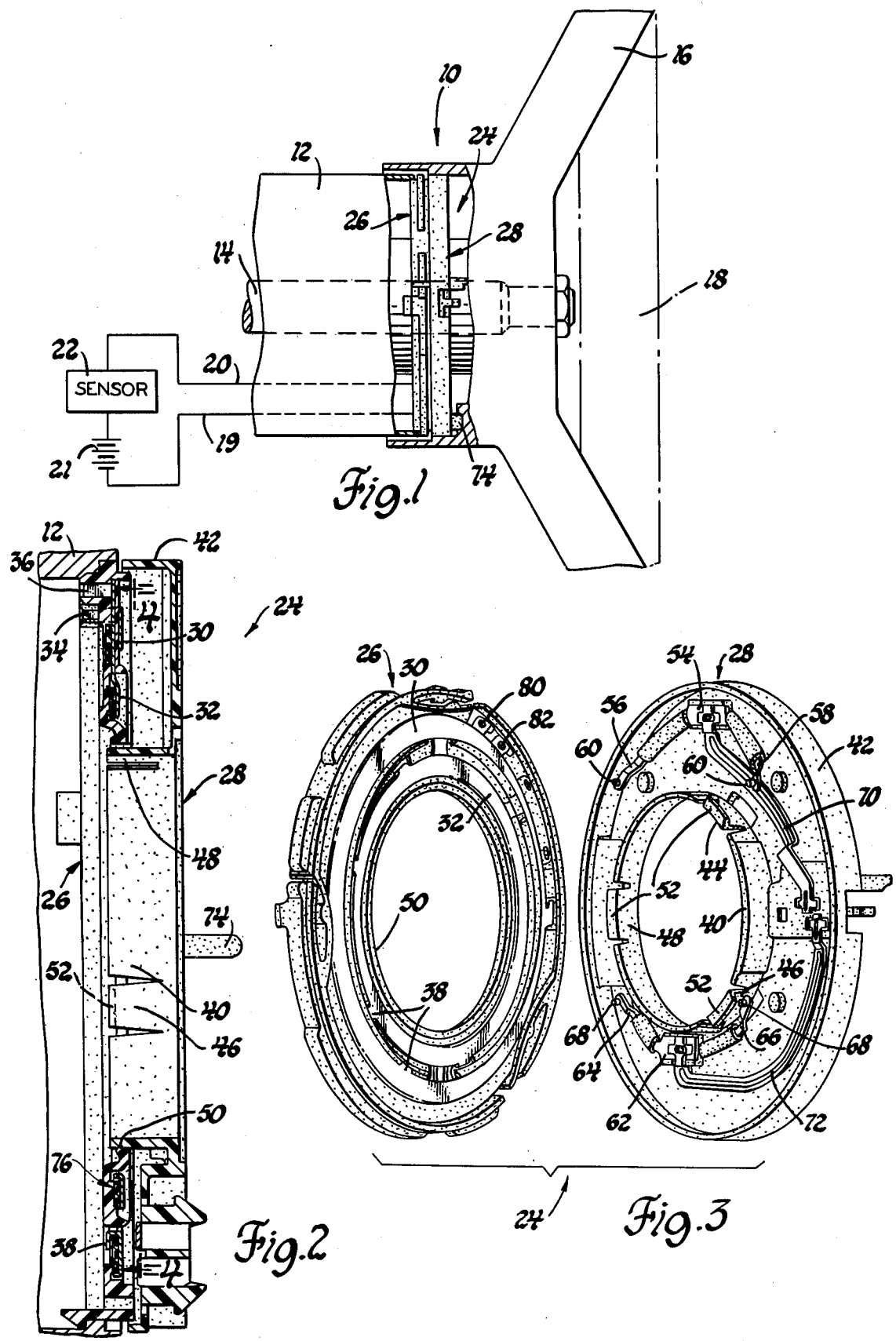

One

STEERING COLUMN ELECTRICAL CONNECTOR ARRANGEMENT

This is a continuation-in-part of patent application U.S. Ser. No. 894,428 filed on Apr. 7, 1978 now abandoned This invention relates to a steering wheel occupant restraint cushion system and more particularly concerns an electrical connector arrangement for such system that is interposed between the steering column and the steering shaft for allowing relative movement therebetween while at the same time providing continuous electrical continuity between a sensor and an occupant restraint cushion mounted in the steering wheel. This invention is characterized in that it utilizes a heater element that is combined with the electrical connector arrangement for preventing frost from forming on the conductors during cold weather.

More specifically, the electrical connector arrangement according to the invention is combined with a motor vehicle steering assembly which includes a steering column member that rotatably supports a steering shaft. A steering wheel is mounted on the steering shaft and has an occupant restraint cushion mounted therein provided with a gas generator which is actuated under predetermined conditions by a sensor on the vehicle. An electrical connector arrangement is interposed between the steering column and the steering shaft for allowing relative rotational movement therebetween while continuously providing electrical continuity between the sensor and the gas generator of the occupant restraint cushion. The electrical connector arrangement comprises a stationary insulator member that takes the form of an annulus and is fixed with the steering column member. A pair of concentric conductor rings are mounted on the insulator member and are adapted to be electrically connected to the sensor. Each of the conductor rings is located in a plane that is substantially perpendicular to the longitudinal center axis of the steering shaft. A heater element is located between the insulator member and each of the conductor rings for heating the latter so as to prevent frost from forming thereon during cold weather. In addition, a pair of flexible contact members are fixed with the steering shaft for continuously maintaining engagement with the conductor rings during rotation of the steering shaft so as to provide electrical current to the occupant restraint system upon operation of the sensor.

The objects of the present invention are to provide a new and improved electrical connector assembly for a motor vehicle steering wheel occupant restraint cushion that uses a pair of concentric conductor rings which are combined with a heater element and which cooperate with a pair of flexible contact members for providing electrical continuity between a sensor and the occupant restraint cushion; to provide a new and improved contact arrangement for maintaining electrical continuity between relatively rotatable members that includes a pair of concentric conductor rings which are combined with a heater system so that during extremely cold weather, frost does not accumulate on the conductor rings and cause a variance in the contact resistance of the electrical contact arrangement; and to provide a new and improved electrical connection between relatively rotatable members which includes conductor rings and contact members and in which the conductor rings are combined with a heater system which is energized through the ignition switch of a motor vehicle.

Other objects and advantages of the invention will be more apparent from the following detailed description when taken with the drawings in which:

FIG. 1 is a schematic diagram of a steering column assembly having an electrical connector arrangement made according to the invention;

FIG. 2 is a sectional view taken of the electrical connector arrangement incorporated with the steering assembly shown in FIG. 1;

FIG. 3 shows the two main parts of the electrical connector assembly in a perspective view and separated from each other;

Figure 4:
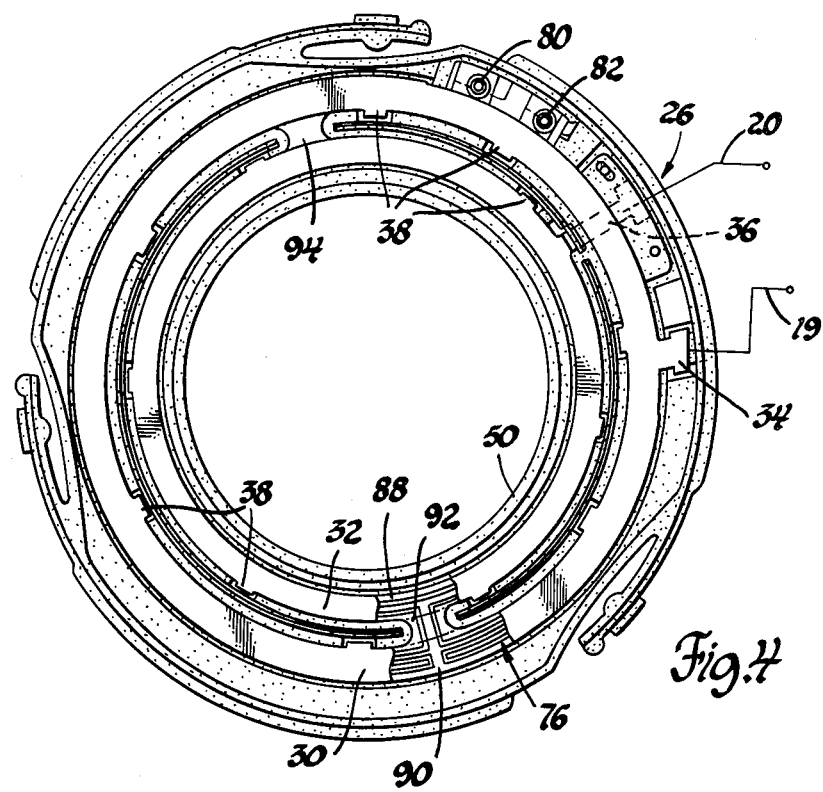
FIG. 4 is a view taken on line 4—4 of FIG. 2.

Referring to the drawings and more particularly to FIG. 1, a motor vehicle steering assembly 10 is shown which includes the usual fixed steering column member 12 which rotatably supports a steering shaft 14 having the upper end thereof fixed with a steering wheel 16. The steering wheel 16 supports an occupant restraint cushion 18 that is shown schematically and which is adapted to be electrically connected through conductors 19 and 20 with a battery 21 and a sensor 22. An electrical connector arrangement 24 that is incorporated in the steering column member 12 serves to provide electrical continuity between the sensor 22 and a gas generator (not shown) in the occupant restraint cushion at all times while allowing the steering wheel to be rotated relative to the steering column member 12.

FIGS. 2–5 illustrate in detail the construction of the electrical connector arrangement 24 and, in this regard, it will be noted that a pair of annulus type support members are provided, one of which serves as a conductor support and is identified by reference numeral 26 and the other of which serves as the contact support and is identified by reference numeral 28. The conductor support member 26 is made of a plastic material and has the outer periphery thereof fixed to the steering column member 12 so as to locate it in a plane that is perpendicular to the longitudinal axis of the steering assembly 10. A pair of concentric conductor rings 30 and 32 made of an electrical conducting material such as silver or copper are mounted to the support member and are integrally formed with terminal portions 34 and 36, respectively, which are adapted to be connected to the sensor and battery as seen in FIG. 1 through conductors 19 and 20. The conductor rings 30 and 32 have their contact surfaces located in a common plane which is also perpendicular to the longitudinal axis of the steering assembly and each ring is formed with a plurality of circumferentially spaced tabs each of which is identified by the reference numeral 38. Each tab 38 extends through an opening provided in the support member and is crimped over at its end so as to permit the associated conductor ring to maintain a fixed position on the support member 26.

The contact support member 28 is also made from a plastic material and includes integral inner and outer concentric skirt members 40 and 42, respectively which serve to enclose the electrical connector arrangement 24 when assembled. The inner skirt member 40 includes three integral tab members 44, 46 and 48 that flex radially inwardly when extended through the opening 50 provided in the conductor support member 26 and then outwardly to allow a finger 52 formed with each tab member 44, 46 and 48 to engage the undersurface of the conductor support member 26 and serve as holding means for preventing axial separation of the support members 26 and 28 while allowing relative rotation therebetween.

A contact member 54 is fixedly connected to the contact support member 28 between the skirts 40, 42 and includes a pair of contact blades 56 and 58 each having a contact button 60 which is adapted to engage the conductor ring 30 when the support members 26 and 28 are assembled together as seen in FIGS. 1 and 2. An additional contact member 62 is connected to the support member 28 and located diametrically opposite to the contact member 54 and also includes a pair of contact blades 64 and 66 each of which is provided with a contact button 68. In this case, the contact buttons 68 are positioned so they engage the conductor ring 32 when the support members are connected together as seen in FIG. 1.

The contact members 54 and 62 are connected with conductors 70 and 72, respectively, which have terminals (not shown) integrally formed therewith that extend through the support member 28 and are adapted to be connected to suitable conductors which lead to the gas generator which forms a part of the occupant restraint cushion system 16 supported in the steering wheel 18. The contact support member 28 has an outwardly projecting stud 74 which is adapted to extend into a suitable opening provided in a portion of the steering wheel 16 so the support member 28, is, in effect, fixed with the steering wheel 16 and rotates therewith. In this manner, relative rotation between the support members 26 and 28 occurs while at the same time the contact members 54 and 62 maintain engagement with the conductor rings 30 and 32.

Figure 5:
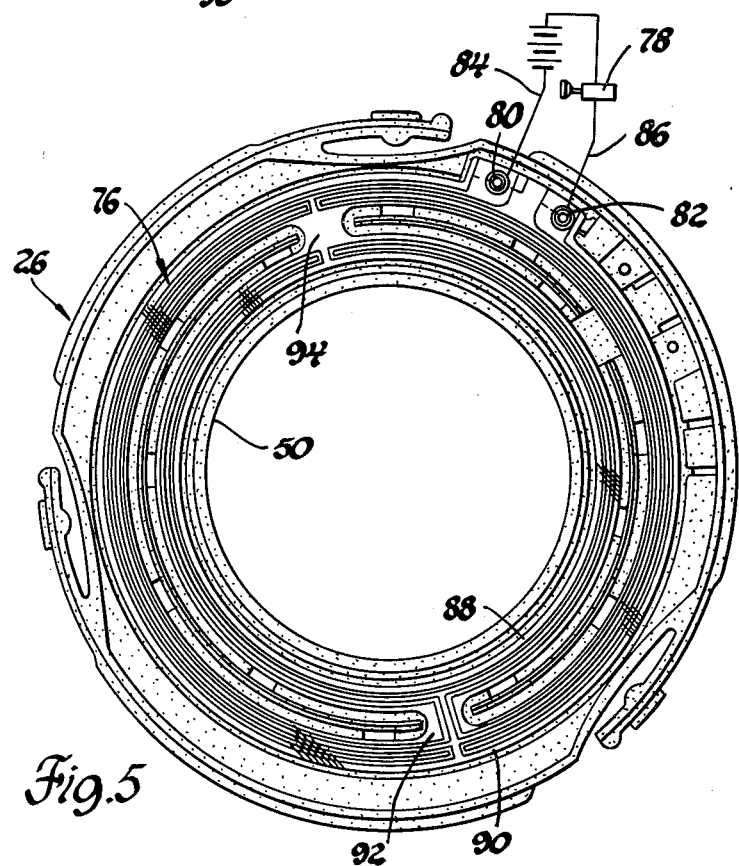
FIG. 5 is a view that is identical to FIG. 4 except that the conductor rings are removed so as to expose the heating element incorporated with the electrical connector arrangement.

FIG. 5 is a view of the support member 26 that is identical to the view shown in FIG. 4 except that the conductor rings 30 and 32 have been removed so as to expose a heater element 76 that is connected through a vehicle ignition switch 78 to a battery. In the preferred form, the heater element 76 is a laminated assembly consisting of an inner and outer film of plastic material with an electrical resistance material interposed therebetween. The resistance material can take the form of a metallic foil or a nickel-chrome resistance wire which is connected to a pair of terminals 80 and 82 which in turn are connected with conductors 84 and 86 of an electric circuit having the ignition switch 78 and battery.

The heater element 76 basically takes the form of a pair of inner and outer concentric rings 88 and 90 which are dimensioned so they correspond in size and shape with the size and shape of the conductor rings 32 and 30, respectively. The rings 88 and 90 of the heater element 76 are interconnected by radially extending connector portions 92 and 94 and include a resistor element that takes the form of a thin metallic foil which starts at a terminal 82 and extends in a clockwise direction along ring 90 to the connector portion 92 at which point it reverses direction and extends in a counterclockwise direction until it reaches the connector portion 94. At this point, the foil once again reverses direction and extends clockwise to the connector portion 92 and then across the latter to the inner ring 88. The foil then extends in a counterclockwise direction to the connector portion 94 at which point it once again reverses direction and extends in a clockwise direction approximately 360° and returns to the connector portion 94. From this point, the foil again reverse direction and extends counterclockwise to the connector portion 92 wherefrom it again crosses the connector portion 92 to the outer ring 90 and extends in a counterclockwise direction to the connector portion 94, reverses direction and extends in a counterclockwise direction to the connector portion 92 wherefrom it again reverses direction and extends in a clockwise direction and connects with the terminal 80. A heater element of this type is known as a Thermofoil heater and a sample was manufactured by Minco Products, Inc., Minneapolis, MN, 55432. The heater element was used successfully in accordance with the invention and was identified by Minco Products, Inc. as Hk7313 7721.

The wattage requirements for the heater element should be very low and allow usage when the vehicle ignition switch 78 is turned to the "on" position or the "accessory" position but should not be energized in the "off-lock" position. The heater element should generate heat on the surface of the conductor rings 30 and 32 at approximately the same rate that the surrounding air temperature is raised so there will be no condensation and, consequently, no frost on the conductor rings under extremely cold and high humidity conditions. As a result, improved contact will be provided between the contact buttons 60 and 68 and the conductor rings 30 and 32 under such conditions without causing variations in the contact resistance of the electrical connector arrangement 24.

An electrical connector arrangement such as described above was successfully tested utilizing a heater element 76 that had a resistance of 124 ohms. This heater element provided a power output of 1.2 watts at 12 volts and was combined with conductors 30 and 32 in the manner heretofore described. The conductors 30 and 32 were made of silver and each was 0.021 inches thick. The conductor 30 had an inner diameter that measured 3.28 inches and an outer diameter that measured 3.75 inches. The conductor 32 had an inner diameter that measured 2.67 inches and an outer diameter that measured 2.98 inches. It was found that when the heater element 76 was energized, it would maintain the conductors 30 and 32 at a temperature 3°–10° above the ambient temperature This temperature differential was sufficient to prevent the conductors from having frost form thereon although frost would form on the parts adjacent the conductors. One test which demonstrated this phenomena was conducted by first having the steering column 10 with the electrical connector arrangement 24 placed in a relatively dry environment at a temperature of −20° F. for a period of approximately 5 hours. The ignition switch 78 was then closed to energize the heater element 76 resulting in the temperature of the conductor rings 30 and 32 being maintained at a temperature of 3–10 degrees warmer than the temperature of the conductor support member 26 and other surrounding parts of the electrical connector arrangement 24 and the steering assembly 10. Afterwards, the steering assembly 10 was introduced to an environment having a temperature of approximately 70° F. and relative humidity of 50%. At this time it was noted that the frost formed on all parts of the steering column except the conductors 30 and 32 even though the heater element 76 raised the temperature of the conductors only a few degrees and the conductors were still at a temperature substantially below 32° F.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a motor vehicle steering assembly including a steering column member rotatably supporting a steering shaft fixed with a steering wheel having an occupant restraint cushion, said vehicle having a sensor for actuating said occupant restraint cushion, an electrical connector arrangement interposed between said steering column member and said steering shaft for allowing relative movement therebetween while continuously providing electrical continuity between said sensor and said occupant restraint cushion, said electrical connector arrangement comprising a stationary insulator member carried by said steering column member; a pair of concentric conductor rings mounted on said insulator member and adapted to be electrically connected to said sensor; a heater element corresponding in shape and size with said conductor rings and being located between said insulator member and each of said conductor rings; an electric circuit including a battery and a switch for energizing said heater element, the resistance of said heater element being such the power output thereof is only sufficient to maintain said conductor rings a few degrees warmer than the temperature of said insulator member and said steering assembly so that during the time that the temperature of said steering assembly, said insulator member and said conductor rings is below 32° F., introduction of high-humidity air into the air space surrounding said electrical connector arrangement causes said steering assembly and said insulator member to remove the moisture from said air space and thereby prevents frost from forming on said conductor rings; and a pair of flexible contact members fixed with said steering shaft for continuously maintaining engagement with said conductor rings during rotation of said steering shaft so as to provide electric current to said occupant restraint cushion upon operation of said sensor.

2. In combination with a motor vehicle steering assembly including a steering column member rotatably supporting a steering shaft fixed with a steering wheel having an occupant restraint cushion, said vehicle having a sensor for actuating said occupant restraint cushion; an electrical connector arrangement interposed between said steering column member and said steering shaft for allowing relative movement therebetween while continuously providing electrical continuity between said sensor and said occupant restraint cushion, said electrical connector arrangement comprising a stationary insulator member carried by said steering column member; a pair of concentric conductor rings mounted on said insulator member and adapted to be electrically connected to said sensor, each of said conductor rings being located in a plane that is substantially perpendicular to the longitudinal center axis of said steering shaft; a heater including a resistance element located between said insulator member and each of said conductor rings; an electric circuit including a battery and an ignition switch for continuously energizing said resistance element and thereby heating said conductor rings, said resistance element being embedded in an insulating material so as to prevent electrical contact with said conductor rings and having a power output which is only sufficient to maintain said conductor rings 3–10 degrees warmer than the temperature of said insulator member and said steering assembly so that during the time that the temperature of said steering assembly, said insulator member, and said conductor rings is below 32° F., introduction of high-humidity air into the air space surrounding said electrical connector arrangement causes said steering assembly and said insulator member to remove the moisture from said air space and thereby prevents frost from forming on said conductor rings; and a pair of flexible contact members fixed with said steering shaft for continuously maintaining engagement with said conductor rings during rotation of said steering shaft so as to provide electric current to said occupant restraint cushion upon operation of said sensor.

* * * * *